(No Model.)
H. WITTMANN.
VESSEL TILTER.
No. 587,417. Patented Aug. 3, 1897.
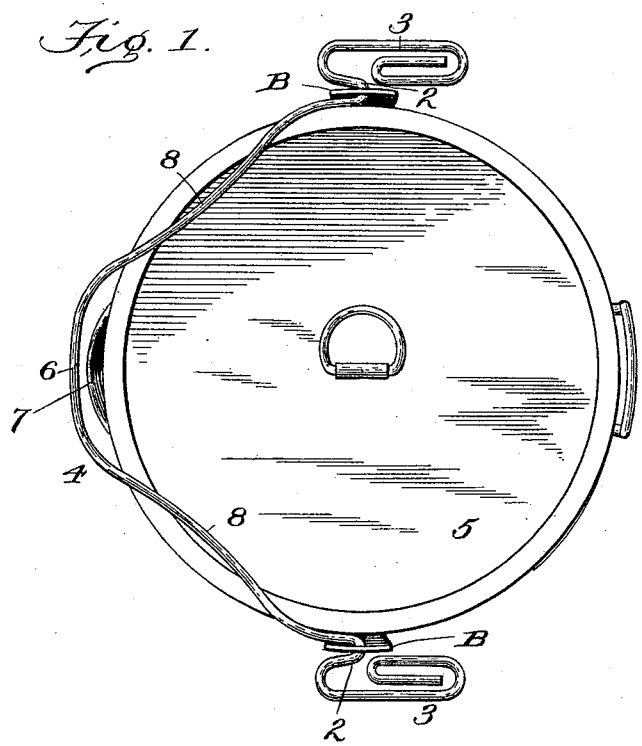
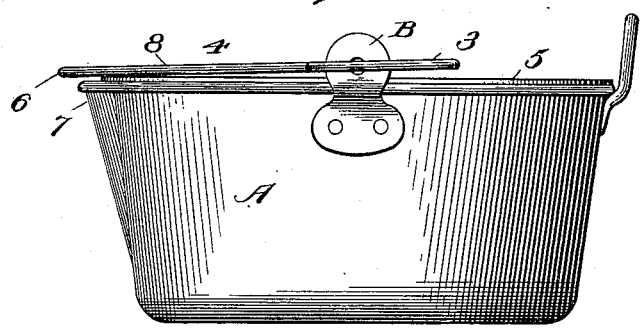
WITNESSES:
Edwin L. Bradford
Bessie Hogan
INVENTOR
Hermann Wittmann
BY
R.S. & A.P. Lacey
ATTORNEYS.

UNITED STATES PATENT OFFICE.

HERMANN WITTMANN, OF LA CROSSE, WISCONSIN.

VESSEL-TILTER.

SPECIFICATION forming part of Letters Patent No. 587,417, dated August 3, 1897.

Application filed November 25, 1896. Serial No. 613,453. (No model.)

*To all whom it may concern:*

Be it known that I, HERMANN WITTMANN, of La Crosse, in the county of La Crosse and State of Wisconsin, have invented an Improved Vessel-Tilter, of which the following is a specification.

The present invention relates to a device for tilting kettles or other vessels, the object being to prevent scalding the hands when drawing off the water after boiling vegetables, meats, &c., a further object of the same being to hold the cover firmly in its place while tilting the kettle.

With these objects in view my invention consists of the details of arrangement and construction which will more fully appear hereinafter.

In the accompanying drawings, which form a part of this application, Figure 1 is a top plan view of a kettle with my device adjusted and ready for operation. Fig. 2 is a side elevation.

Like numerals and letters of reference indicate corresponding parts in both the views.

Referring to the drawings, letter A represents a kettle to which my improved device is attached, which device, as will be readily seen, is the bail 4 of the said receptacle. The bail above referred to is made of any suitable material—in the present instance heavy wire. The ends 2 of the said bail pass through apertured ears B, situated diametrically opposite each other on the sides of the kettle. The ends 2, after passing through the said apertured ears, are bent in the manner shown, so as to form handles 3, by means of which the kettle is tilted. It will be seen that the bail 4 is pressed over in the operation of tilting and pressed down upon the cover 5 of the said kettle, the said bail 4 being so shaped that it projects well within the diameter of the said cover, as illustrated in Fig. 1 by the numeral 8, and holds it in position. The said bail is so constructed as to project beyond the sides of the kettle quite a distance, the object in doing this being to keep the point 6 of the bail from becoming too hot for handling by the manipulator when it is desired to lift the kettle. A spout 7 is provided on the side of the vessel for pouring off the water, as is usually the case in such receptacles.

The mode of operating the above will be readily seen from the above description by those skilled in the art to which it relates.

It will also be observed that without departing from the spirit of my invention apertures may be made in the opposite sides of the vessel near the rim in substitution of the apertured ears B.

Having thus described my invention, what I claim, and desire to secure by Letters Patent, is—

1. The combination with a vessel, of a bail hinged thereto, the ends of said bail being bent so as to form handles for operating the bail, the said bail adapted to bear upon the cover of the vessel, substantially as described.

2. The combination with a vessel, of a bail hinged thereto, the ends of said bail being bent so as to form handles for operating the same, the said bail being formed so as to bear upon the cover of the vessel, and to extend beyond the same, substantially as described.

In testimony whereof I affix my signature in the presence of two witnesses.

HERMANN WITTMANN.

Witnesses:
 WALTER C. WINTER,
 NANNIE FERSTAD.